United States Patent
Masood

(10) Patent No.: US 8,474,048 B2
(45) Date of Patent: Jun. 25, 2013

(54) WEBSITE CONTENT REGULATION

(75) Inventor: Syed Ghouse Masood, Hyderabad (IN)

(73) Assignee: F-Secure Oyj, Helsinki (FI)

( * ) Notice: Subject to any disclaimer, the term of this patent is extended or adjusted under 35 U.S.C. 154(b) by 657 days.

(21) Appl. No.: 12/460,272

(22) Filed: Jul. 16, 2009

(65) Prior Publication Data
US 2010/0017880 A1    Jan. 21, 2010

(30) Foreign Application Priority Data

Jul. 21, 2008  (MY) ................................ PI20082702

(51) Int. Cl.
*H04L 29/06*  (2006.01)

(52) U.S. Cl.
USPC .................. 726/24; 726/12; 726/22; 726/23; 709/203; 709/217; 709/220; 707/102

(58) Field of Classification Search
USPC ............................ 726/1, 22, 24; 709/203, 223
See application file for complete search history.

(56) References Cited

U.S. PATENT DOCUMENTS

| | | | |
|---|---|---|---|
| 7,865,953 B1 * | 1/2011 | Hsieh et al. | 726/22 |
| 7,945,563 B2 * | 5/2011 | Seitz | 707/722 |
| 8,356,352 B1 * | 1/2013 | Wawda et al. | 726/22 |
| 2009/0064337 A1 * | 3/2009 | Chien | 726/25 |
| 2009/0138937 A1 * | 5/2009 | Erlingsson et al. | 726/1 |

OTHER PUBLICATIONS

Hallaraker et al "Detecting Malicious JavaScript code in Mozilla". Department of computer Science, University of California, Santa Barbara, Proceeding of 10th IEEE international conference (ICECCS 2005) Jun. 20, 2005 10 pages.*

Defeating script injection attacks with browser-enforced embedded policies Issue Title: 16th International World Wide Web Conference, WWW2007 Jim, Trevor; Swamy, Nikhil; Hicks, Michael 16th International World Wide Web Conference, WWW2007 Publication Date Jan. 26, 2007.*

* cited by examiner

*Primary Examiner* — Taghi Arani
*Assistant Examiner* — Jason Lee
(74) *Attorney, Agent, or Firm* — Harrington & Smith

(57) ABSTRACT

A method of facilitating the scanning of web pages for suspect and/or malicious hyperlinks that includes receiving at a content hosting website, user generated content. A web page or web page containing said content is then generated and, in the web page source code is included a detection code segment or a link from which a detection code segment can be downloaded. The detection code segment is executable by a web browser or web browser plug-in to scan the web page(s), or cause the web page(s) to be scanned, for suspect and/or malicious links.

19 Claims, 2 Drawing Sheets

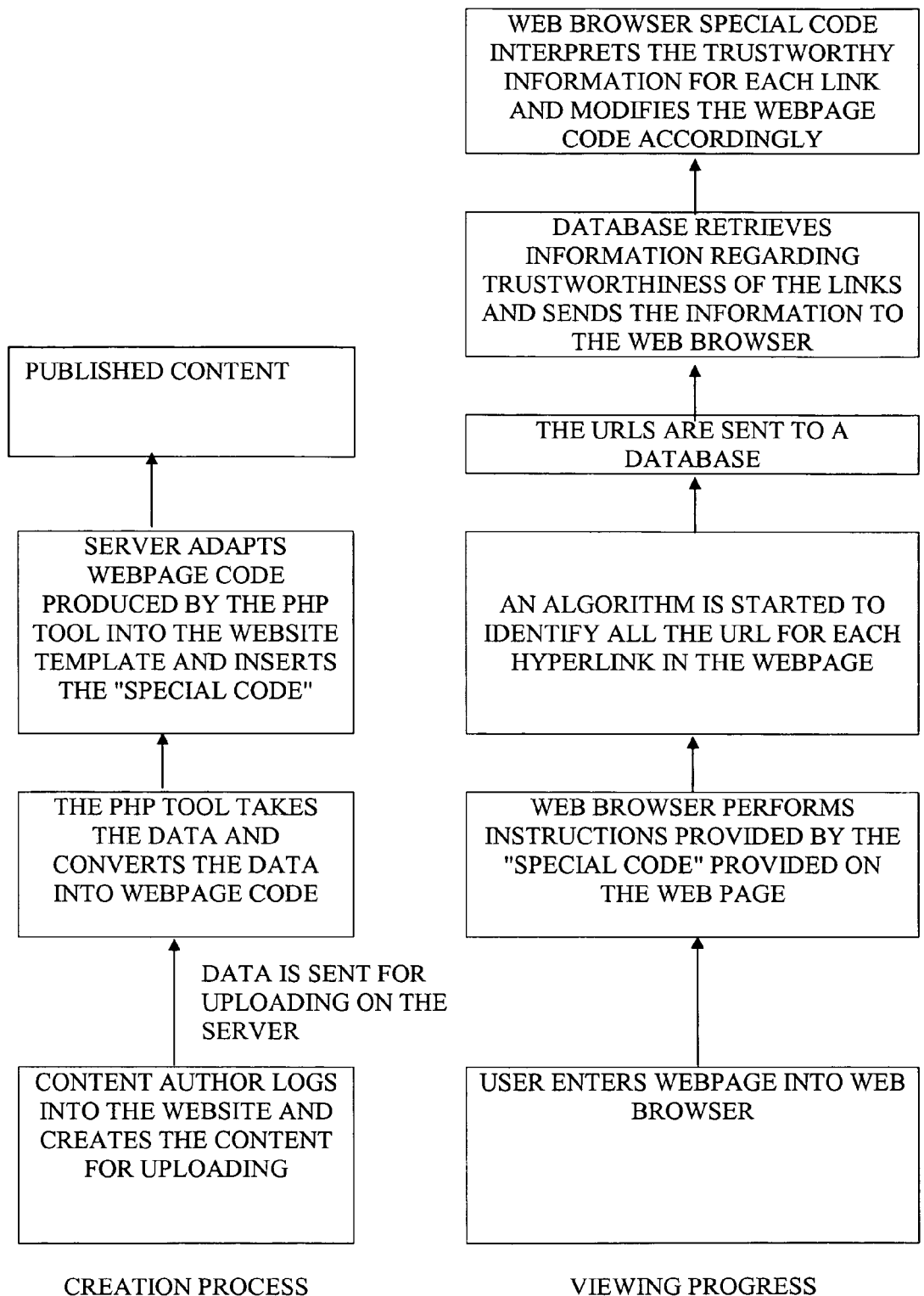

WEBSITE CONTENT REGULATION

FIELD OF THE INVENTION

The present invention relates to website content regulation and in particular, though not necessarily, to a method and apparatus for providing protection for users visiting websites hosting content that contains links to malicious material including malicious websites and links to websites hosting unsolicited advertising or otherwise undesirable material.

BACKGROUND OF THE INVENTION

The need for security against malicious material accessible over the Internet is well appreciated. Such material can be placed into two broad categories: adware and malware. Adware exposes an Internet user to the unsolicited advertisement of goods or services. Malware is more sinister in nature and enacts fraud, or causes other types of damage to the Internet user. It is also desirable to protect Internet users against undesirable material such as adult websites.

A malicious website will typically attempt to deceive the visitor into believing that the website is safe. For example, the website might be designed to imitate a legitimate banking website, tricking a visitor into entering sensitive information directly into the website. A malicious website might alternatively or additionally contain links that, when "clicked" on, download spyware or other types of virus onto the user's computer. Spyware can be used to deliver a user's personal information to an attacker.

In order to be successful, an operator of a malicious website must create traffic to the website. This may be done, for example, by placing hyperlinks to the malicious website in a seemingly legitimate context so as to trick the user into believing the link is safe. Such a context might for example be a "phishing" email that looks as if it has originated from a legitimate organisation, such as a bank, the email requesting the recipient to click on a link (leading to the malicious site) in the email. However, the general public are now more alert to the dangers of phishing attacks and are less likely to succumb to them. Anti-virus applications have also developed sophisticated techniques for dealing with phishing attacks, and are more widely implemented. As such, the owners of malicious websites are seeking new ways of driving traffic to their websites.

The growth of websites using the so-called second generation website platform (Web 2.0) provides an opportunity for malicious website operators. A common feature of Web 2.0 websites is that the content of the website, in contrast to conventional websites, is not created by the website operator but by the website users. Technologies that fit into the Web 2.0 category include web blogs, social bookmarking, wikis, podcasts, RSS feeds which automatically feed content from an external website to the target website, and social networking sites. Web 2.0 websites are some of the most popular websites on the World Wide Web. For example, Web 2.0 websites like Wikipedia™, Facebook™, YouTube™ and del.icio.us™ have millions of visitors each day. There is also an enormous amount of content on these websites that changes on a daily basis. Due to the interconnected nature of the content on these websites, complex networks of links to different external websites can be embedded within them.

The content of Web 2.0 based websites can be created in various ways. For example, a website user might have an account with the Web 2.0 website through which he can upload content onto a section of the website, with the section having it's own unique web address (URL). The access rights to the content on the website can vary from website to website. Certain websites allow a user to place access restrictions to the user's section, whereas other websites have no access restrictions so that the content is automatically available for anyone to view. Once the content has been made available on the website, it is said to have been "published". Web 2.0 websites may allow visitors to particular pages to add comments to the pages. Hence further content can be added to a user's section by people who do not necessarily have an "account" with the website. A website may also host content generated by RSS technology, where the content is generated externally to the website and automatically displays within a webpage. RSS generated content may change in realtime.

The reason that malicious parties can use these Web 2.0 websites (and similar websites that host similarly unregulated content) to their advantage is that the public typically views these websites as trustworthy. The public may not be alert to the fact that the content is not created by the website operator itself, or may assume that the operator has somehow regulated third party content. Hence it is possible for malicious parties to upload content that contains links to malicious websites or to adware and to hide behind the goodwill of the website operator.

A means to protect users from the dangers of malicious links embedded within seemingly innocent Web 2.0 content is for the website operator to implement bespoke security measures at the server(s) on which the website is hosted. For example, a server could scan uploaded content for blacklisted URLs. If a URL is identified as malicious the link to the URL could be removed from the content before it is published, or the entire submission could be rejected. This approach relies of course on the blacklist of malicious URLs being up-to-date.

An anti-virus application vendor may be an appropriate channel for providing the detection software and for providing blacklist updates to website operators. However, as different servers and website operators often use different server programming tools [such as PHP, Common Gateway Interface (CGI), Active Server Pages (ASP), and Server Side Includes (SSI)], and the tools rely upon different programming languages [such as PERL, Python, Ruby, and C++], the detection software would have to be customised for each server. In any case, Web 2.0 websites can experience enormous amounts of Internet traffic and so it would be very difficult to have the resources at the servers to scan content in a dynamic manner.

SUMMARY OF THE INVENTION

It is recognised that there are significant drawbacks associated with detection procedures that are entirely server based. The invention arises from a realisation that it is much easier to scan content once it has been rendered into a web browser language such HTML, as these languages are highly standardised. Furthermore, by performing scanning at the user terminals, the load on the servers may be substantially reduced.

According to a first aspect of the invention, there is provided a method of facilitating the scanning of web pages for suspect and/or malicious hyperlinks comprising receiving at a content hosting website, user generated content; generating a web page or web pages containing said content; and including in the web page source code, a detection code segment or a link from which a detection code segment can be downloaded, said detection code segment being executable by a web browser or web browser plug-in to scan the web page(s), or cause the web page(s) to be scanned, for suspect and/or malicious links.

Preferably the web page source code is HTML or WML source code.

Preferably the detection code segment comprises a scripting language that can be interpreted by the web browser or web browser plug-in. The scripting language is preferably one of Java, JavaScript, VBScript or ActionScript.

Preferably the method also comprises receiving and updating said detection code segment from a third party website.

The method preferably comprises incorporating said detection code segment into the source code of a web page template and using the template to generate said web page(s) containing the received user generated content.

According to a second aspect of the invention, there is provided a computer arranged in use to be coupled to the Internet and being configured to receive user generated content submitted over the Internet; generate a web page or web pages containing said content; and include in the web page source code, a detection code segment or a link from which a detection code segment can be downloaded, said detection code segment being executable by a web browser or web browser plug-in to scan the web page(s), or cause the web page(s) to be scanned, for suspect and/or malicious links.

According to a third aspect of the invention, there is provided a method of identifying suspect and/or malicious hyperlinks in a web page downloaded to a client terminal, the method comprising at the client terminal, identifying hyperlinks within the web page source code; inspecting a database of suspect and/or malicious URLs to determine whether any identified hyperlinks contain suspect and/or malicious URLs; and if it is determined that an identified hyperlink does contain a suspect and/or malicious URLs, modifying the webpage in accordance with a defined policy; wherein the web page source code contains a detection code segment and the client terminal executes the code segment to cause the recited steps to be performed.

Preferably the method comprises downloading the detection code segment to the client terminal from a URL identified in the web page source code.

Preferably the method comprises executing the detection code segment within a web browser or web browser plug-in.

Preferably the recited steps are performed by one of a browser extension or Browser Object Helper.

Preferably the recited steps are performed prior to the web page being displayed at the client terminal.

Preferably the step of inspecting a database comprises sending URLs of any identified hyperlinks to a remote verification resource, and receiving back from the resource, at the client terminal, an indication of whether or not any identified hyperlinks contain suspect and/or malicious URLs.

Preferably the step of inspecting a database comprises inspecting a database maintained locally at the client terminal.

Preferably the step of inspecting a database causes a safety rating to be returned for identified suspect and/or malicious links. More preferably the step of modifying the webpage in accordance with a defined policy comprises modifying the webpage in dependence upon the returned safety rating(s).

Preferably the step of modifying the webpage comprises one or more of: deleting or inactivating a hyperlink, replacing the hyperlink with a predefined hyperlink, adding a comment to a hyperlink, and modifying a hyperlink to link initially to a safety warning.

Preferably upon detection of a suspect and/or malicious link at the client terminal, an alert is sent identifying the link to the website from which the web page(s) containing the link was downloaded.

According to a fourth aspect of the invention, there is provided a computer program for running on a computer within an Internet browser environment to cause the computer to identify hyperlinks within a web page source code; extract from the web page source code a detection code segment or a link from which a detection code segment can be downloaded; inspect a database of suspect and/or malicious URLs to determine whether any identified hyperlinks contain suspect and/or malicious URLs; and if it is determined that an identified hyperlink does contain a suspect and/or malicious URLs, to modify the webpage in accordance with a defined policy; wherein the computer is arranged to execute the detection code segment to perform the above recited steps.

According to a sixth aspect of the invention, there is provided a computer configured to receive user generated content, to generate a web page or web pages containing said content, and to include in the web page source code, a detection code segment or a link from which a detection code segment can be downloaded, said detection code segment being executable by a web browser or web browser plug-in to scan the web page(s), or cause the web page(s) to be scanned, for suspect and/or malicious links.

BRIEF DESCRIPTION OF THE DRAWINGS

FIG. 2a illustrates a server-based process for introducing malicious link detection code into content to be hosted at a website; and FIG. 2b illustrates a web browser process utilising the detection code introduced into a downloaded web page.

DETAILED DESCRIPTION OF CERTAIN EMBODIMENTS

Figure 1:
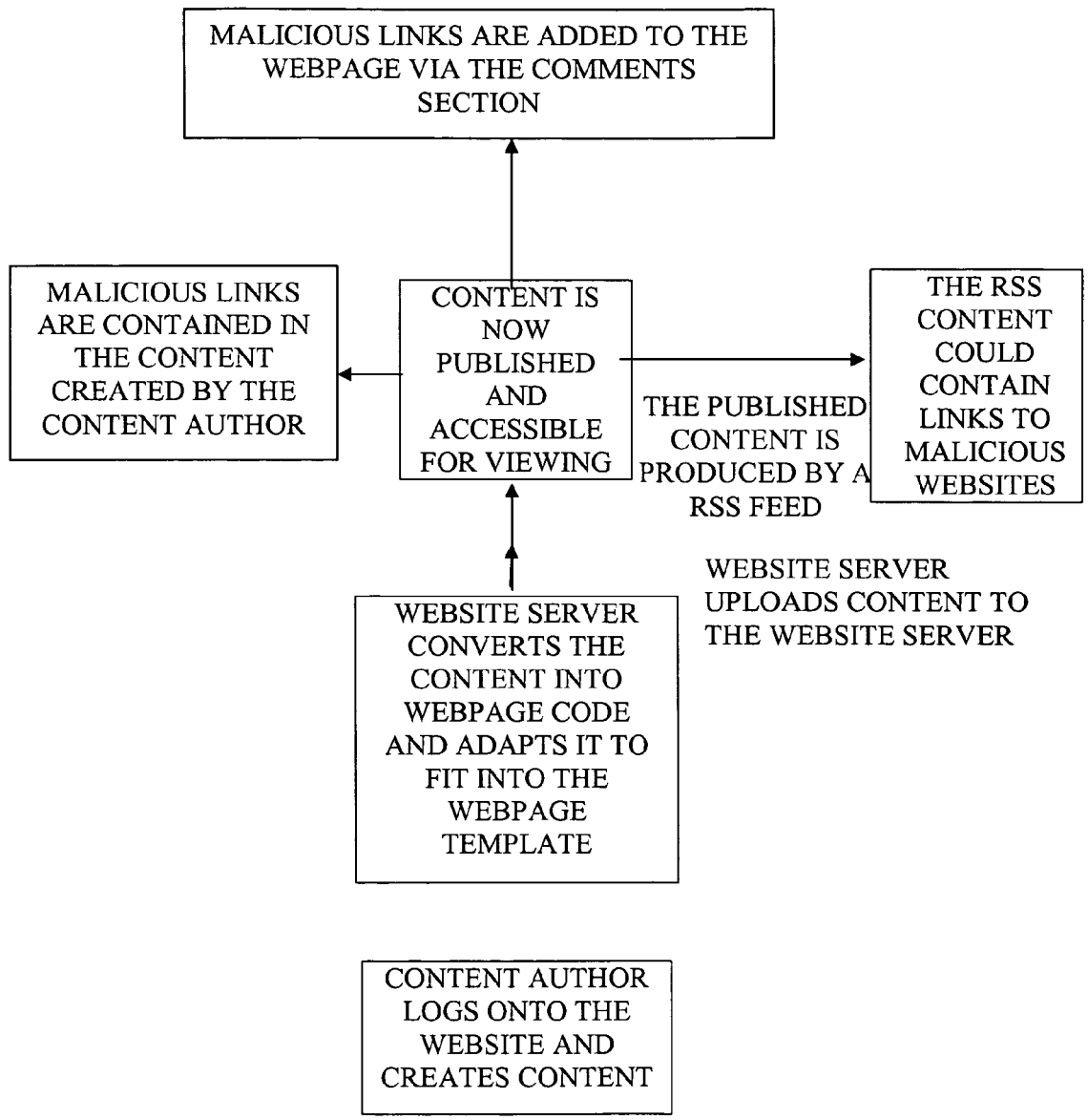
FIG. 1 illustrates a prior art process by which content containing malicious links is uploaded and published on a website server.

Before describing embodiments of the invention in detail, the steps involved in creating and viewing content on a typical Web 2.0 website will be considered with reference to FIG. 1.

A content author typically adds content to the Web 2.0 website by logging into the website via a personal account. The author might be presented with a submission webpage for the user to upload content in the form of text, images, and multimedia. The content may contain hyperlinks which are associated with URLs of external websites. The content may also include an RSS feed. The RSS feed may, for example, be from a news website importing links to headline stories. A server-based programming technology, for example, PHP, then converts the submitted content into a standardised web page format such as HTML (or WML). The resulting webpage will typically conform to a "house style".

The website server then publishes the web page within the content author's section (with appropriate access restrictions if applicable). Once the content has been published, visitors may be able to interact with it. Visitors may, for example, add content to the page by entering comments in a comments section of the page that can be viewed by other visitors. Depending on the content author's preference settings, the content author may vet the comments or they could be displayed automatically. Of course, these comments may in themselves contain links to external websites or pages hosted by the same website.

FIG. 1 illustrates various ways in which a malicious party could incorporate into Web 2.0 hosted content, links to a malicious website. As explained earlier, the party could himself author and submit content including malicious URLs in what might otherwise seem to be a trustworthy webpage, for example the page of a personal web-blog. A malicious party could add comments to the web pages of other parties, the comments including malicious links. This could be done either manually or using some robotic mechanism. Alternatively, a malicious party could "persuade" innocent parties to use an RSS feed which causes malicious links to be displayed on those innocent parties' websites.

It should of course be borne in mind that the content behind a link may be changed at any time. Thus, for example, a malicious party could locate innocent content at a given URL when content is uploaded to a Web 2.0 website, and subsequently replace the innocent content with malicious content.

In order to provide protection against all of the scenarios described above, it is desirable to perform checks on hyperlinks at regular intervals, and not just when content is uploaded to a website.

A solution to detecting malicious links is to incorporate scanning code into hosted web pages at the Web 2.0 servers and which can be executed at the client terminals following download. The execution may be performed by the client terminal web browser or web browser plug-in (the term web browser plug-in is to be understood to cover any type of web browser add-on or add-in, for example, the web browser plug-in may be a browser extension or a Browser Object Helper). This will now be described in more detail with reference to FIG. 2. It involves firstly (FIG. 2A) inserting a special piece of code into the HTML content during the publishing process. The content author is unaware of this process and creates and submits content in the normal way. The website server technology converts the data into a standardised web page language such as HTML. Alternatively, the website server may have a standard HTML template that already has the special code within it and the user content is integrated into the standard template. Following conversion, a segment of code is inserted into the web page. This code could be written in any browser or browser plug-in interpretable scripting language, for example Java, JavaScript, VBScript or ActionScript. The inserted code implements a malicious hyperlink detection process as will be described below. The webpage is then published and is accessible for browsing.

FIG. 2b illustrates a procedure implemented at a web browser employed by a client terminal. A user will first of all access the Web 2.0 website, for example by clicking on a hyperlink to the website. The user will then navigate through the website to find a web page of interest. The source code (HTML) for each web page is downloaded into a cache memory available to the browser. The browser identifies the hyperlink detection code within the web page source code (typically the code is inserted at or close to the top of the source code list) and executes this code prior to displaying the web page within the browser window.

The special code contains instructions to scan the source code and identify any URLs contained within it. The special code may also be arranged to identify special identifying information, such as meta-data or XML tags that, although not displayed to a user, is used by other tools. Attackers may enclose malicious content in this information, and the special code therefore scans the identified information for the malicious content. Once all URLs have been identified, the special code initiates a search for the identified URLs in a verification resource. The verification resource is typically an Internet accessible resource, for example a remote server operated by an anti-virus provider. The verification resource contains a blacklist of URLs together with rating data identifying the trustworthiness of the target websites. The blacklist is constantly updated to add newly identified malicious sites (and possibly delete defunct sites). The operator responsible for maintaining the database will typically identify malicious sites by scanning the Internet and by receiving reports from users. Whilst it is possible to maintain the verification resource locally at the browser, this would require that the user terminal run a special application in order to obtain updates.

The web browser receives back from the verification resource an indication of whether or not an identified URL is contained within the blacklist and, if so, a rating report for the link. The detection code continues to execute and, for each identified malicious link, modifies the webpage source code in dependence upon the rating report. For example, the detection code may completely disable the corresponding hyperlink so that a user cannot follow the link. This may be appropriate for links which directly download viruses onto the user's computer. Alternatively, for a link which connects to adware or other undesirable content, the page may be modified such that, when a user clicks on or passes a cursor over the link, a warning message is displayed together with the rating report. The user can then make a personal decision on whether or not to click the link. Of course, to prevent accidental clicking, the page may be modified so that clicking on the blacklisted link does not cause the link to be followed directly but rather causes a warning to be displayed, together with an option to continue to the link. Following execution of the detection code, the modified webpage is then displayed to the user.

Upon detection of a malicious link, the detection code may additionally cause an alert to be sent to the Web 2.0 website operator. The operator may react by removing the content containing the malicious link from the website.

It will be appreciated that the website server is not directly involved in scanning web pages for malicious links. Insertion of detection code into web pages is performed only once, at content upload, and there is no need for the server to act at each and every download. The inserted detection code will cause subsequently added comments, and RSS feed data, to be scanned at the user terminals. Hence, little extra load is placed on website servers. Furthermore, as the security of each link is checked prior to a web page being displayed to a user, the problem of once innocent links becoming malicious after the uploading of content is addressed. The HTML code for a given webpage on a website host server, can actually have a different form once received and executed at a web browser of a user terminal in comparison to the HTML code generated at the website host server. This can be due to perfectly legitimate techniques such as the use of Ajax (that enables dynamic creation of web content) or malicious attacks that use Cross Site Scription (XSS) to inject malicious code into the web pages being viewed by a user. The present invention avoids this discrepancy between host server content and the content loaded into the web browser by scanning the HTML code as it exists in the user's browser. Therefore, the website operator, by including the detection code within the web pages hosted on its server, can protect all users from malicious content, regardless of whether or not the user has their own security software installed.

A modification to this mechanism involves including in the web page source code an instruction which causes a web browser to download the special code from a specified URL and to suspend display of the web page within the browser window until the code has been downloaded and executed.

An advantage of the mechanisms described above is that it is much easier to modify webpage templates as these are typically based on standardised languages like HTML or WML, whereas server end processes can vary from server to server and also contain internal mechanisms that are unique to each server.

It will be appreciated by the skilled person that various modifications may be made to the above described embodiments without departing from the scope of the present invention. For example, whilst the invention has been illustrated above with reference to Web 2.0 websites, it is also applicable to conventional websites, or other websites that host user generated content.

The invention claimed is:

1. A method of facilitating a scanning of web pages for suspect and/or malicious hyperlinks and comprising:
   receiving at a content hosting website, user generated content;
   generating a web page or web pages containing said content; and
   including in the web page source code, a detection code segment or a link from which a detection code segment is downloaded,
   said detection code segment being executable by a web browser or web browser plug-in to scan the web page(s), or cause the web page(s) to be scanned, for suspect and/or malicious links.

2. A method according to claim 1, wherein said web page source code is HTML or WML source code.

3. A method according to claim 1, wherein said detection code segment comprises a scripting language that can be interpreted by the web browser or web browser plug-in.

4. A method according to claim 1 and comprising receiving and updating said detection code segment from a third party website.

5. A method according to claim 1 and comprising incorporating said detection code segment into the source code of a web page template and using the template to generate said web page(s) containing the received user generated content.

6. A computer comprising a processor and a memory arranged in use to be coupled to the Internet and being configured to:
   receive user generated content submitted over the Internet;
   generate a web page or web pages containing said content; and
   include in the web page source code, a detection code segment or a link from which a detection code segment is downloaded,
   said detection code segment being executable by a web browser or web browser plug in to scan the web page(s), or cause the web page(s) to be scanned, for suspect and/or malicious links.

7. A method of identifying suspect and/or malicious hyperlinks in a web page downloaded to a client terminal, the method comprising:
   at the client terminal, identifying hyperlinks within the web page source code;
   inspecting a database of suspect and/or malicious URLs to determine whether any identified hyperlinks contain suspect and/or malicious URLs; and
   if it is determined that an identified hyperlink does contain a suspect and/or malicious URLs, modifying the webpage in accordance with a defined policy;
   wherein the web page source code contains a detection code segment and the client terminal executes the code segment to cause the recited steps to be performed.

8. A method according to claim 7 and comprising downloading the detection code segment to the client terminal from a URL identified in the web page source code.

9. A method according to claim 7 and comprising executing the detection code segment within a web browser or web browser plug-in.

10. A method according to claim 7, the recited steps being performed by one of a browser extension or Browser Object Helper.

11. A method according to any one of claim 7, the recited steps being performed prior to the web page being displayed at the client terminal.

12. A method according to claim 7, said step of inspecting a database comprising sending URLs of any identified hyperlinks to a remote verification resource, and receiving back from the resource, at the client terminal, an indication of whether or not any identified hyperlinks contain suspect and/ or malicious URLs.

13. A method according to claim 7, said step of inspecting a database comprising inspecting a database maintained locally at the client terminal.

14. A method according to claim 7, said step of inspecting a database causing a safety rating to be returned for identified suspect and/or malicious links.

15. A method according to claim 14, said step of modifying the webpage in accordance with a defined policy comprising modifying the webpage in dependence upon the returned safety rating(s).

16. A method according to claim 7, said step of modifying the webpage comprising one or more of: deleting or inactivating a hyperlink, replacing the hyperlink with a predefined hyperlink, adding a comment to a hyperlink, and modifying a hyperlink to link initially to a safety warning.

17. A method according to claim 7 and comprising, upon detection of a suspect and/or malicious link at the client terminal, sending an alert identifying the link to the website from which the web page(s) containing the link was downloaded.

18. A non-transitory computer-readable storage medium storing a computer program which when run on a computer, causes the computer to:
   identify hyperlinks within a web page source code;
   extract from the web page source code a detection code segment or a link from which a detection code segment can be downloaded;
   inspect a database of suspect and/or malicious URLs to determine whether any identified hyperlinks contain suspect and/or malicious URLs; and
   if it is determined that an identified hyperlink does contain a suspect and/or malicious URLs, to modify the webpage in accordance with a defined policy;
   wherein the computer is arranged to execute the detection code segment to perform the above recited steps.

19. A non-transitory computer-readable storage medium storing a computer program which when run on a computer, causes the computer to:
   receive user generated content, to generate a web page or web pages containing said content, and to include in the web page source code, a detection code segment or a link from which a detection code segment can be downloaded, said detection code segment being executable by a web browser or web browser plug-in to scan the web page(s), or cause the web page(s) to be scanned, for suspect and/or malicious links.

* * * * *